(12) United States Patent
Wu (10) Patent No.: US 8,753,020 B2
(45) Date of Patent: Jun. 17, 2014

(54) HYBRID ASSEMBLY HAVING CONDUCTIVE TERMINALS AND LENSES SANDWICHED THEREBETWEEN

(75) Inventor: Jerry Wu, Irvine, CA (US)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 186 days.

(21) Appl. No.: 13/349,580

(22) Filed: Jan. 13, 2012

(65) Prior Publication Data

US 2012/0183257 A1    Jul. 19, 2012

(30) Foreign Application Priority Data

Jan. 15, 2011    (CN) .......................... 2011 1 0008528

(51) Int. Cl.
*G02B 6/00* (2006.01)
*G02B 6/36* (2006.01)

(52) U.S. Cl.
USPC ............................... 385/53; 385/74; 385/147

(58) Field of Classification Search
USPC .................... 385/74–76, 88–92, 147
See application file for complete search history.

(56) References Cited

U.S. PATENT DOCUMENTS

| | | | | |
|---|---|---|---|---|
| 7,422,488 | B1* | 9/2008 | Wu ............................... | 439/676 |
| 7,717,733 | B1* | 5/2010 | Yi et al. ........................ | 439/452 |
| 7,896,559 | B2* | 3/2011 | Yi et al. ........................ | 385/75 |
| 8,262,296 | B2* | 9/2012 | Liao et al. ...................... | 385/90 |
| 8,403,568 | B2* | 3/2013 | Wang et al. .................... | 385/76 |
| 8,439,575 | B2* | 5/2013 | He et al. ........................ | 385/53 |
| 2005/0059301 | A1 | 3/2005 | Chou et al. | |
| 2009/0067853 | A1* | 3/2009 | Cunneen et al. .............. | 398/200 |
| 2010/0080519 | A1 | 4/2010 | Ko et al. | |
| 2011/0123149 | A1* | 5/2011 | Hemenway, Jr. et al. ....... | 385/32 |
| 2011/0255825 | A1* | 10/2011 | Ko et al. ........................ | 385/15 |
| 2012/0099823 | A1* | 4/2012 | Wu ................................ | 385/88 |

FOREIGN PATENT DOCUMENTS

| | | |
|---|---|---|
| CN | 101345358 | 1/2009 |
| CN | 101345358 A | 1/2009 |
| CN | 101640325 | 2/2010 |
| CN | 101640325 A | 2/2010 |
| CN | 101656363 | 2/2010 |
| CN | 101656363 A | 2/2010 |
| CN | 201438224 | 4/2010 |
| CN | 201438224 U | 4/2010 |
| CN | 201438225 | 4/2010 |
| CN | 201438225 U | 4/2010 |
| CN | 201478499 | 5/2010 |
| CN | 201478499 U | 5/2010 |
| CN | 201497817 | 6/2010 |
| CN | 201497817 U | 6/2010 |
| CN | 201548721 | 8/2010 |
| CN | 201548721 U | 8/2010 |
| CN | 101825747 | 9/2010 |

(Continued)

*Primary Examiner* — Akm Enayet Ullah
(74) *Attorney, Agent, or Firm* — Wei Te Chung; Ming Chieh Chang (57) ABSTRACT

A cable assembly comprises: a housing having a receiving groove through an front surface and a rear surface thereof; a plurality of conductive terminals received in the housing, a cable electrically connected to the conductive terminals and a spacer having a basic portion located behind the housing and a tongue portion extending forwardly from the basic portion and received in the receiving groove. A plurality of lenses are located on a front end of the tongue portion of the spacer, and a plurality of optical fibers are corresponded and coupled to the lenses, respectively.

20 Claims, 7 Drawing Sheets

(56) References Cited

FOREIGN PATENT DOCUMENTS

| CN | 101825747 A | 9/2010 |
| CN | 201583694 | 9/2010 |
| CN | 201583694 U | 9/2010 |
| CN | 101867114 | 10/2010 |
| CN | 101867114 A | 10/2010 |
| CN | 101876731 | 11/2010 |
| CN | 101876731 A | 11/2010 |
| CN | 101907748 | 12/2010 |
| CN | 101907748 A | 12/2010 |
| CN | 201666962 | 12/2010 |
| CN | 201666962 U | 12/2010 |

\* cited by examiner

HYBRID ASSEMBLY HAVING CONDUCTIVE TERMINALS AND LENSES SANDWICHED THEREBETWEEN

FIELD OF THE INVENTION

The present invention relates to a cable assembly, and more particularly to a cable assembly with a plurality of optical fibers for improving signal transmission rate.

DESCRIPTION OF PRIOR ART

A personal computer or a consumer electronic product always has a display device for displaying the video signal, a control device and a cable connector assembly connecting the display device to the control device. A Display Port connector can be a good input/output ports in the personal computer or the consumer electronic product. For the development of the electronic industry and technology, many manufacturers are constantly striving to improve the transmission rate of the existing cable connector assembly. Nowadays, there is an optical signal can be transmitted to improve the transmission rate of the USB connector assembly. So, the transmission rate of the USB connector assembly can be improved by setting an optical fiber in the USB connector assembly. Many people are trying to increase an optical fiber into a Display Port connector assembly to improve the transmission rate. However, increasing an optical fiber into the Display Port connector assembly, the volume of the Display Port connector assembly may be increased.

As discussed above, an improved cable assembly overcoming the shortages of existing technology is needed.

SUMMARY OF THE INVENTION

Accordingly, an object of the present invention is to provide a cable assembly having a plurality of optical fibers and reasonable assembly structure.

In order to achieve the above-mentioned objects, a cable assembly comprises a housing having a receiving groove through an front surface and a rear surface thereof, a plurality of conductive terminals received in the housing, a cable electrically connected to the conductive terminals and a spacer having a basic portion located behind the housing, and a tongue portion extending forwardly from the basic portion and received in the receiving groove. A plurality of lenses are located on a front end of the tongue portion of the spacer, and a plurality of optical fibers are corresponded and coupled to the lenses, respectively.

Other objects, features and advantages of the invention will be apparent from the following detailed description taken in connection with the accompanying drawings.

DETAILED DESCRIPTION OF PREFERRED EMBODIMENTS

Reference will now be made to the drawing figures to describe the present invention in detail.

Referring to FIGS. 1 to 7, a cable assembly 100 in accordance with the present invention comprises a housing 1, a plurality of conductive terminals 2 received in the housing 1, a spacer 3 assembled in the housing 1, a cable 4 electrically connected to the conductive terminals 2, a metal shell 5 enclosing the housing 1 and an outer cover 6 enclosing the metal shell 5.

Figure 1:
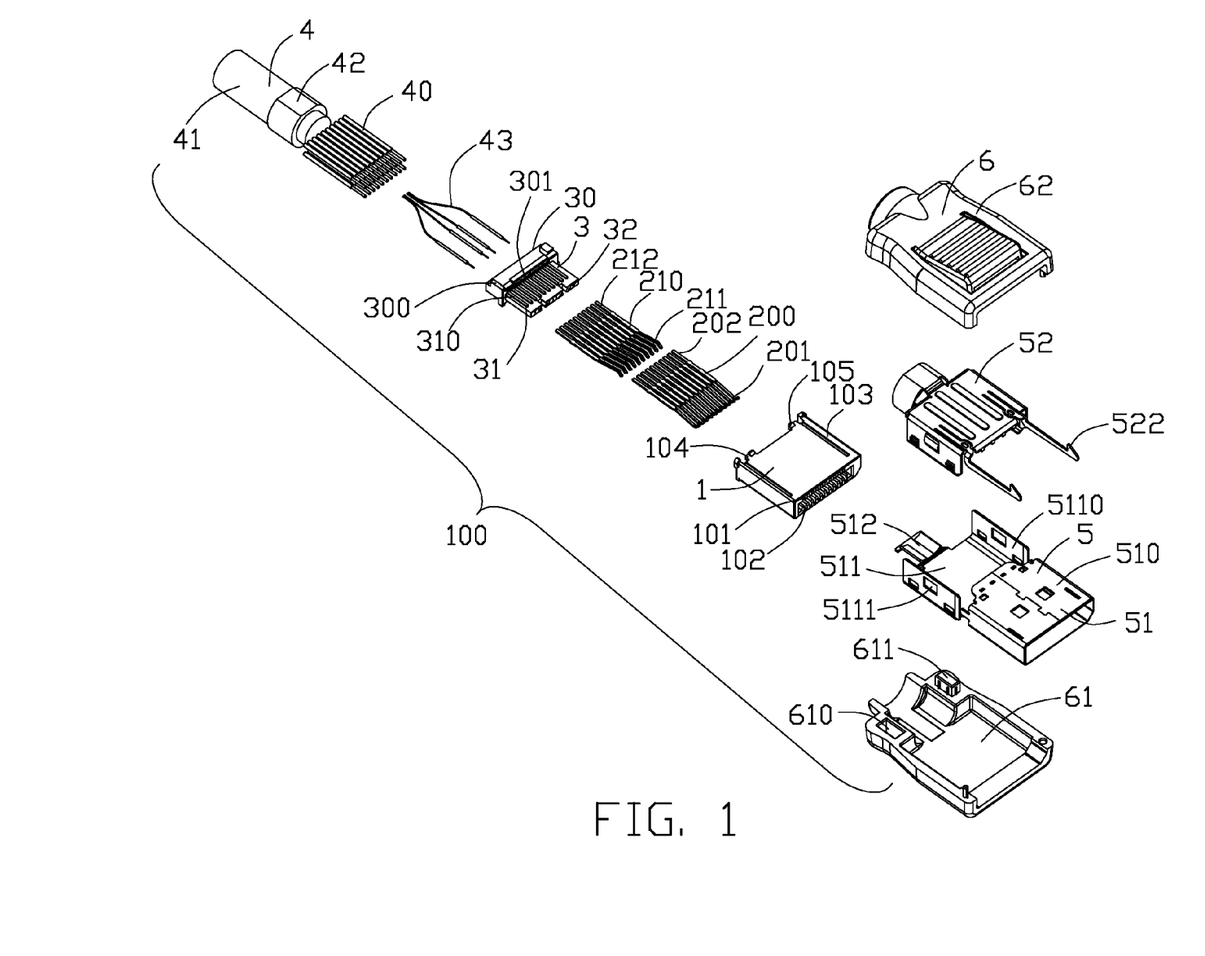
FIG. 1 is an exploded, perspective view of a cable assembly in accordance with the present invention.
Figure 2:
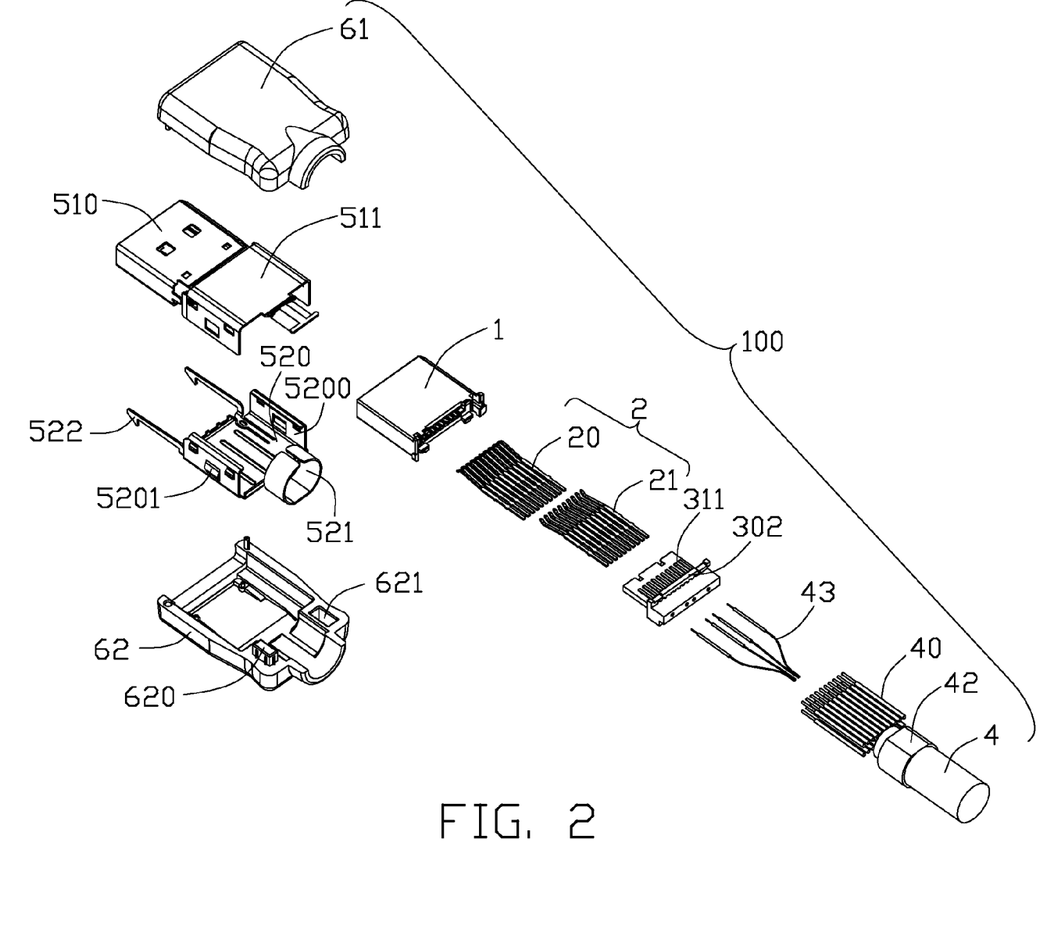
FIG. 2 is a view similar to FIG. 1, but from another aspect.

Referring to FIGS. 1 to 2, the housing 1 defines a receiving groove 10 through the front and rear surfaces thereof. A row of first receiving slots 101 are defined on an upper surface of the receiving groove 10 and a row of second receiving slots 102 are defined on a lower surface of the receiving groove 10. The receiving slots 102 receive the conductive terminals, respectively. A pair of slits 103 are recessed downwardly from an upper surface of the housing 1 and extended along a front-to-rear direction of the cable assembly 100. The housing 1 also defines a pair of fastening portions 104 beyond a rear surface of housing 1. The fastening portion 104 has a protrusion 105 extending upwardly from the surface thereof.

The conductive terminals 2 define a plurality of first terminals 20 received in the first receiving slots 101 and a plurality of second terminals 21 received in the second slots 102. The first terminal 20 comprises a first main portion 200, a first mating portion 201 extending forwardly from the first main portion 200 and a first tail portion 202 extending rearwardly from the first main portion 200. The second terminal 21 comprises a second main portion 210, a second mating portion 211 extending forwardly from the second main portion 210 and a second tail portion 212 extending rearwardly from the second main portion 210.

The spacer 3 comprises a basic portion 30 located behind the housing 1 and a tongue portion 31 extending forwardly from the basic portion 30 for being received in the receiving groove 10 of the housing 1. A plurality of through holes 32 are through the front and rear surfaces of the spacer 3. A number of lenses 320 are assembled in the front ends of the through holes 32, respectively. The basic portion 30 of the spacer 3 defines a pair of first convexes 300 located on the upper surface thereof and extending along the front-to-rear direction of the cable assembly 100. A second convex 301 which is perpendicular to the first convexes 300 is located between the first convexes 300. The basic portion 30 also defines a plurality of receiving holes 302 through the front and rear surfaces thereof for receiving the tail portions of the conductive terminals 2. The tongue portion 31 of the spacer 3 defines a plurality of first length-ribs 310 located on an upper surface thereof for supporting the first terminals 20 and a plurality of second length-ribs 311 located on a lower surface thereof for supporting the second terminals 21, respectively. The spacer 3 also defines a pair of cutouts 312 recessing rearwardly from the front surface of the tongue portion 31 for mating to a complementary connector (not shown). The cutout 312 has two intervals of gaps 3120 which are of semi-circular shaped.

The cable 4 comprises a plurality of wires 40 electrically connected to the first and second terminals 20, 21, and an outer skin 41 enclosing the wires 40. A metallic ring 42 is assembled on a braid layer (not shown) between the outer skin 41 the wires 40. The cable 4 further comprises a number of optical fibers 43 received in the through holes 32 of the spacer 3, respectively.

The metal shell 5 comprises a first shell 51 and a second shell 52 assembled on the first shell 51. The first shell 51 comprises a mating portion 510 located on the front thereof, a retaining portion 511 extending rearwardly from a lower surface of the mating portion 510 and a splinter 512 extending rearwardly from a rear end of the retaining portion 511. Two lateral walls 5110 of the retaining portion 511 define a plurality of locking holes 5111. The second shell 52 comprises a U-shaped main body 520 corresponding to the retaining portion 511 and a holding portion 521 extending rearwardly from the rear end of the upper surface of the main body 520. The holding portion 521 holds the cable 4 and the metallic ring 42. Two lateral walls 5200 of the main body 520 define a plurality of locking pin 5201 corresponding to the locking holes 5111, respectively. The main body 520 of the second shell 52 defines a pair of locking arms 522 extending forwardly from two laterals of the front end of the main body 520 and received in the slits 103.

The outer cover 6 comprises a lower cover 61 and an upper cover 62 assembled on the lower cover 61. The shapes of the upper and lower cover 62, 61 are the same. The lower cover 61 defines a first notch 610 recessing downwardly from a mating surface thereof and a first column 611 raising upwardly from the mating surface. The upper cover defines a second column 620 raising upwardly from a mating surface thereof for being received in the first notch 610 and a second notch 621 recessing downwardly from the mating surface thereof for receiving the first column 611.

Figure 3:
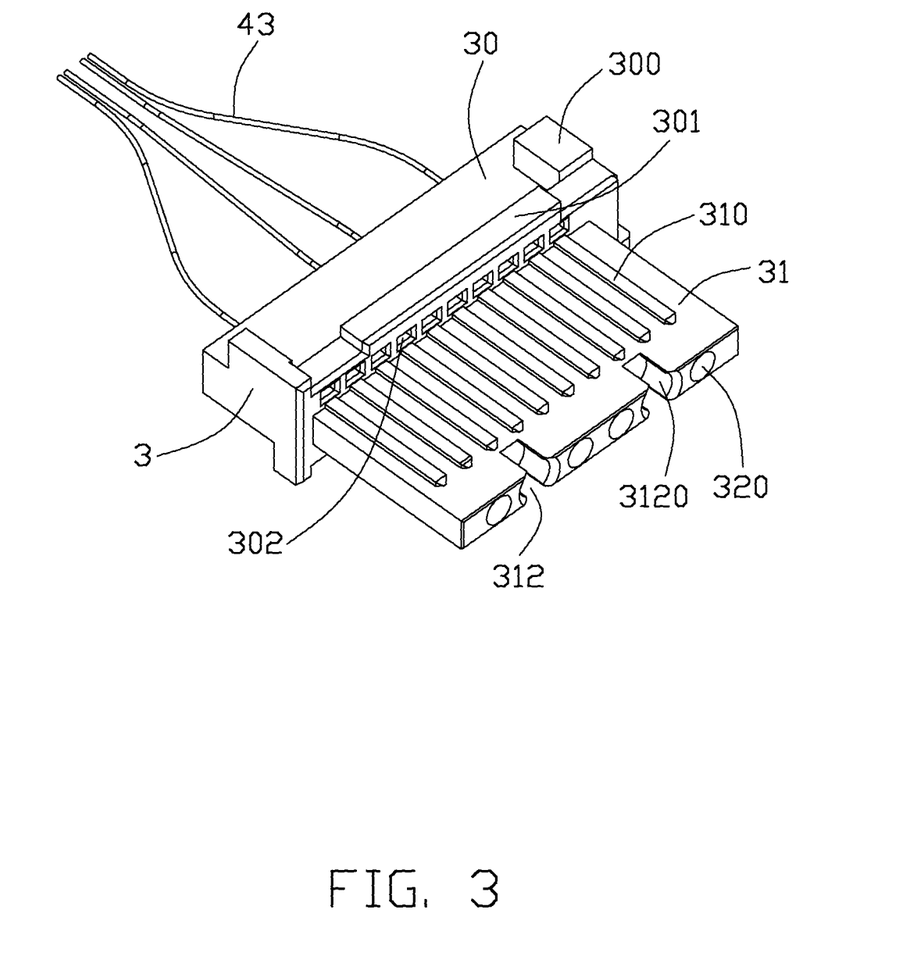
FIG. 3 is the first partially assembled, perspective view of the cable assembly shown in FIG. 1.

In assembly, the conductive terminals 2 are assembled in the housing 1, the first terminals 20 are received in the first receiving slots 101, and the second terminals 21 are received in the second receiving slots 102. The tail portions 202, 212 of the first and second terminals 20, 21 are beyond the rear surface of the housing 1.

Figure 4:
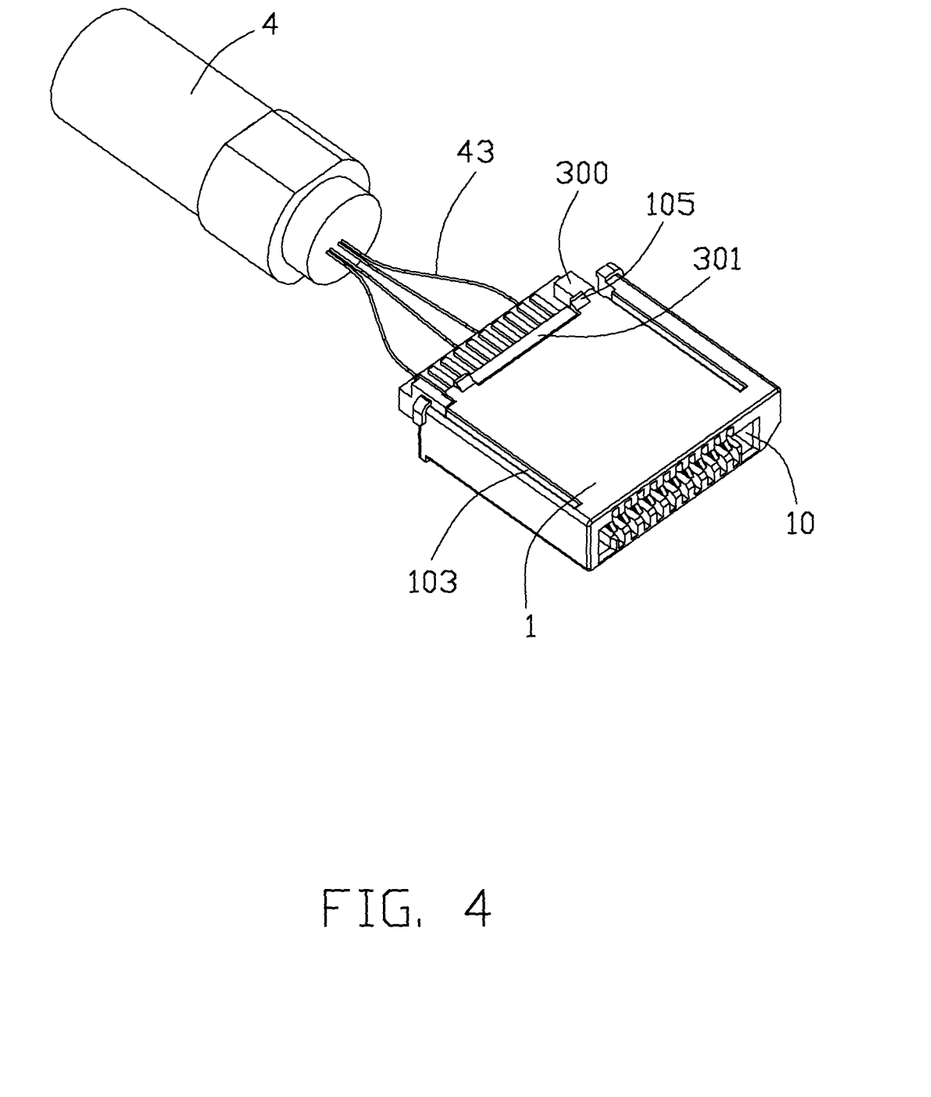
FIG. 4 is the second partially assembled, perspective view of the cable assembly shown in FIG. 1.
Figure 7:
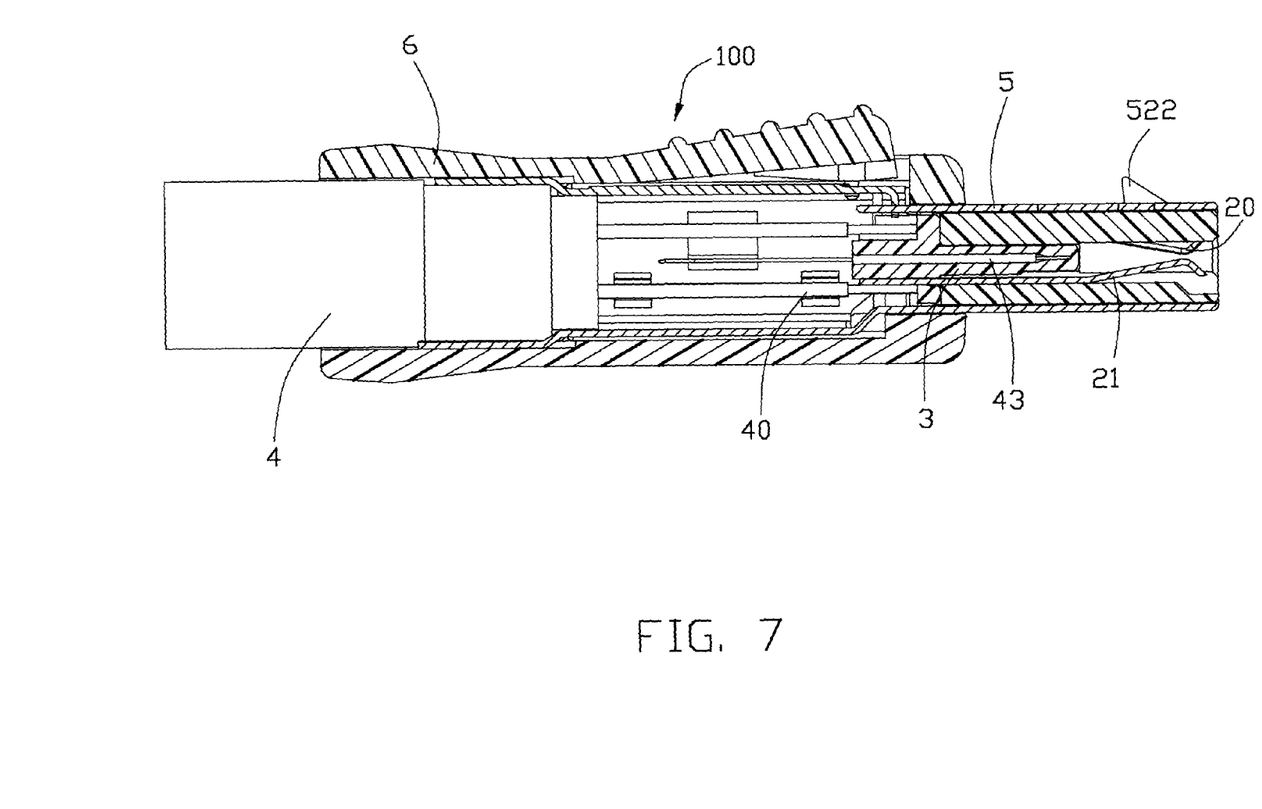
FIG. 7 is a cross section view of the cable assembly of FIG. 6 taken along line 7-7.

The optical fibers 43 of the cable 4 are passed through the through holes 32 of the spacer 3 and extend forwardly to the front surface of the spacer 3. The optical fibers 43 are in alignment with and coupling to the lenses 320. The spacer 3 and the optical fibers 43 are sandwiched between the first receiving slots 101 and the second receiving slots 102. The first terminals 20 and the second terminals 21 respectively are displayed on the upper and lower surface of the tongue portion 31, and tail portions are through the receiving holes 302. The second convex 301 of the spacer 3 is attached to the rear surface of the housing 1 and located between two fastening portions 104. The wires 40 of the cable 4 are respectively soldered on the tail portions 202, 212 of the first and second terminals 20, 21.

Figure 5:
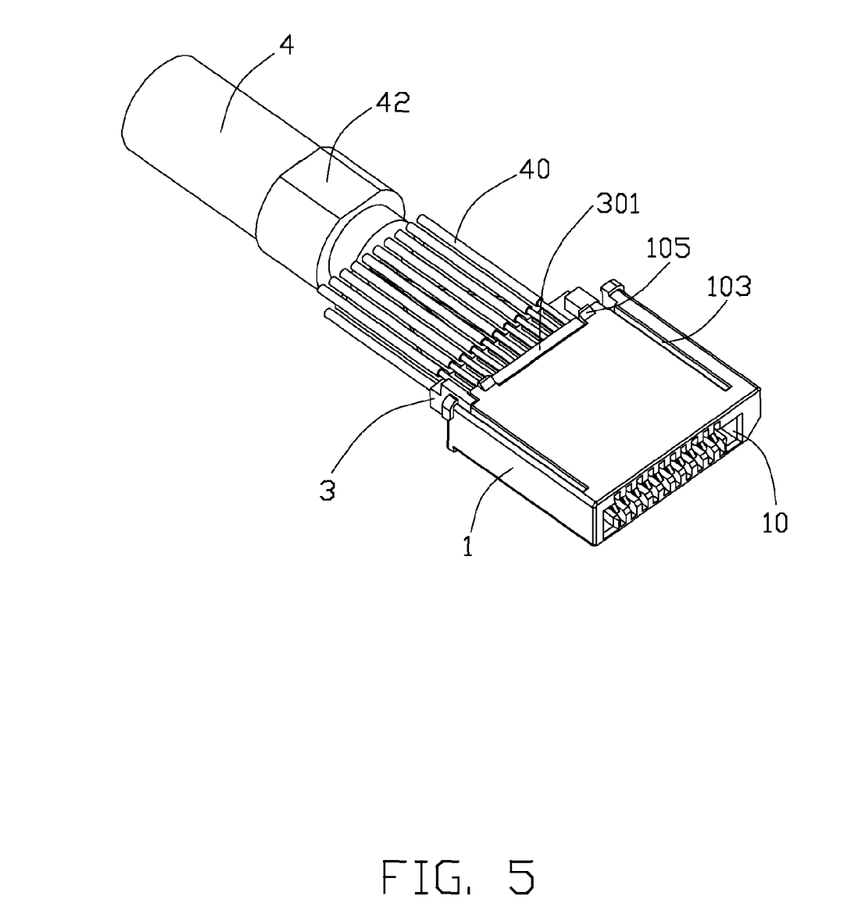
FIG. 5 is the third partially assembled, perspective view of the cable assembly shown in FIG. 1.
Figure 6:
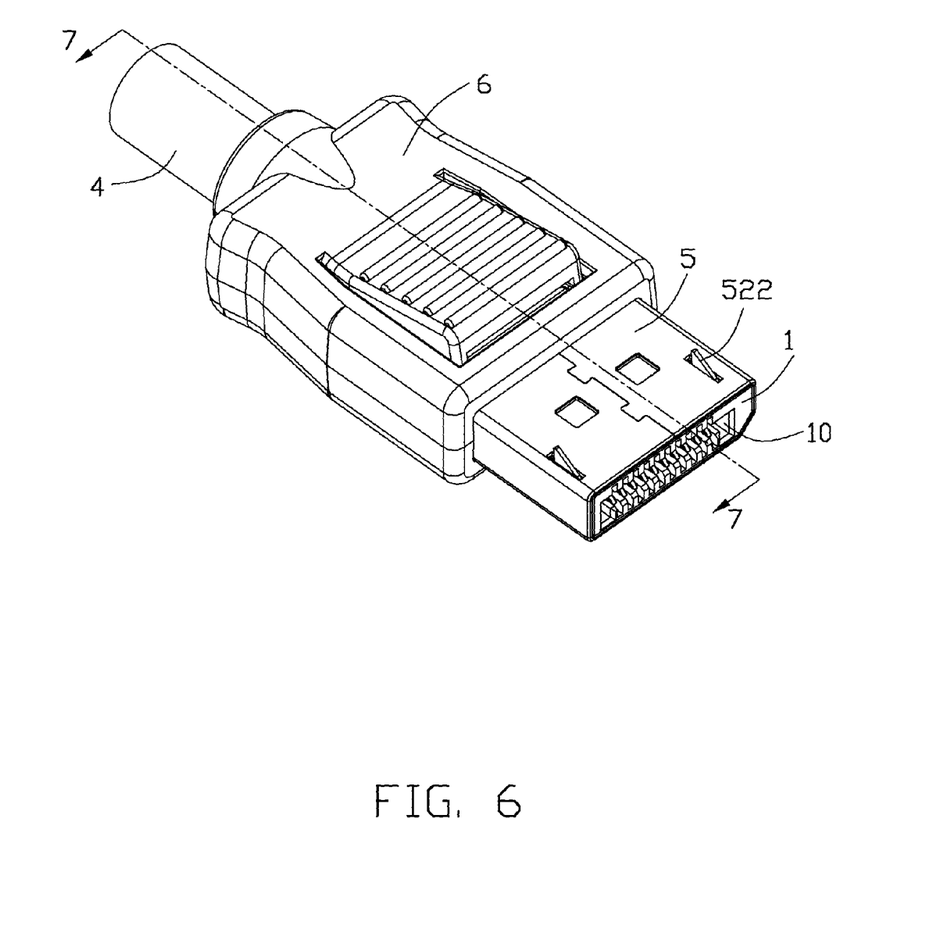
FIG. 6 is a perspective view of the cable assembly shown in FIG. 1.

The housing 1 is received in the first shell 51, and the mating portion 510 encloses the housing 1. The metallic ring 42 is held by the splinter 512. The second shell 52 is assembled on the first shell 51 by the locking pins 5201 being received in the locking holes 5111. The outer cover 6 is assembled on the metal shell 5 and encloses the metal shell 5 and the cable 4.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A cable assembly, comprising:
    a housing having a receiving groove through an front surface and a rear surface thereof;
    a plurality of conductive terminals received in the housing, the conductive terminals comprising front mating sections exposed into the receiving groove, the conductive terminals arranged in two rows in a transverse direction perpendicular to said front-to-back direction, the two rows of the conductive terminals spaced apart from each other along vertical direction perpendicular to said front-to-back direction and the transverse direction;
    a cable electrically connected to the conductive terminals;
    a spacer discrete from the housing and having a basic portion located behind the housing, and a tongue portion extending forwardly from the basic portion and received in the receiving groove, the tongue portion sandwiched between said two rows of the conductive terminals in the vertical direction, the tongue portion disposed behind the mating sections;
    a plurality of lenses located on a front end of the tongue portion of the spacer; and
    a plurality of optical fibers corresponded and coupled to the lenses, respectively.

2. The cable assembly as recited in claim 1, wherein the spacer defines a number of through holes through a front and rear surface thereof, and the optical fibers are received in the through holes for coupling to the lenses.

3. The cable assembly as recited in claim 1, wherein the housing defines a pair of fastening portions fixing the spacer each other.

4. The cable assembly as recited in claim 3, wherein the fastening portion is extended rearwardly from an upper surface of the housing and beyond a rear surface of the housing.

5. The cable assembly as recited in claim 1, wherein a row of first receiving slots defined on an upper surface of the receiving groove and a row of second receiving slots defined on a lower surface of the receiving groove, and the conductive terminals are received in the first and second receiving groove.

6. The cable assembly as recited in claim 1, wherein the tongue portion of the spacer defines a plurality of first length-ribs located on an upper surface thereof and a plurality of second length-ribs located on a lower surface thereof for supporting the conductive terminals, respectively.

7. The cable assembly as recited in claim 1, wherein the basic portion also defines a plurality of receiving holes through the front and rear surfaces thereof for receiving a plurality of tail portions of the conductive terminals, respectively.

8. The cable assembly as recited in claim 1, wherein the conductive terminals are displayed on the front and rear surfaces of the tongue portion.

9. The cable assembly as recited in claim 8, wherein the spacer further defines a pair of cutouts recessing rearwardly from the front surface of the tongue portion for mating to a complementary connector.

10. The cable assembly as recited in claim 9, wherein the cutout has two intervals of gaps which are of semi-circular shaped.

11. The cable assembly as recited in claim 1, wherein the cable assembly further comprises a metal shell enclosing the housing.

12. The cable assembly as recited in claim 11, wherein the metal shell comprises a first shell and a second shell assembled on the first shell.

13. The cable assembly as recited in claim 12, wherein the first shell comprises a mating portion located on the front thereof and a retaining portion extending rearwardly from a lower surface of the mating portion.

14. A cable connector assembly comprising:
an insulative housing defining a front mating port and a receiving cavity in a front-to-back direction;
a plurality of contacts disposed in the housing with front mating sections exposed into the mating port and rear mounting sections outside of the housing;
a spacer discrete from while being forwardly assembled to the housing in said front-to-back direction with a front portion received in the receiving cavity and forwardly communicating with the mating port, and a rear portion exposed outside of the housing to position the rear mounting sections of the contacts thereon;
optical lens means applied upon an end of the front portion of the spacer and forwardly communicating with the mating port in said front-to-back direction; and
a cable set including wires mechanically and electrically connected to the rear mounting sections of the corresponding contacts, respectively, and optical fibers coupled to the corresponding lens means, respectively;
wherein the front mating sections are arranged in two rows in a transverse direction perpendicular to said front-to-back direction, and the lens means is located between said two rows in a vertical direction perpendicular to both said front-to-back direction and said transverse direction.

15. The cable connector assembly as claimed in claim 14, wherein the rear mounting sections are arranged in two rows in the transverse direction, and the spacer is sandwiched between said two rows around the rear mounting sections in the vertical direction.

16. A cable connector assembly for mating with a complementary connector for both electrical and optical transmission, comprising:
an insulative housing defining a front mating port forwardly communicating with an exterior in a front-to-back direction for receiving said complementary connector therein;
a plurality of contacts disposed in the housing with front mating sections exposed to the mating port and communicating with the mating port in a vertical direction perpendicular to said front-to-back direction, and rear mounting sections extending rearwardly out of the housing;
a spacer discrete from and located behind the housing and providing abutting structures for supporting the rear mounting sections thereon; and
optical lens means applied upon the spacer and forwardly communicating with the mating port in the front-to-back direction;
further including a cable set including wires electrically connected to the mounting sections of the contacts, respectively, and optical fibers extending into the spacer to be coupled to the corresponding lens means, respectively.

17. The cable connector assembly as claimed in claim 14, wherein the spacer defines a pair of cutouts in the end of the front portion, and the optical lens means are located by two sides of each of said cutouts in the transverse direction.

18. The cable connector assembly as claimed in claim 14, wherein the spacer defines a plurality of ribs abutting against the corresponding contacts in the vertical direction, respectively.

19. The cable connector assembly as claimed in claim 16, wherein the spacer defines a pair of cutouts in an end of a front portion of the spacer, and the optical lens means are located by two sides of each of said cutouts in a transverse direction perpendicular to both said front-to-back direction and said vertical direction.

20. The cable connector assembly as claimed in claim 16, wherein spacer defines a plurality of ribs abutting against the corresponding contacts in the vertical direction.

* * * * *